United States Patent [19]
Elias

[11] Patent Number: 4,749,633
[45] Date of Patent: Jun. 7, 1988

[54] BATTERY WATERING DEVICE

[76] Inventor: Leonard W. Elias, 1277 Lakeview La., Highland, Mich. 48031

[21] Appl. No.: 107,114

[22] Filed: Oct. 13, 1987

[51] Int. Cl.⁴ ............................................. H01M 2/36
[52] U.S. Cl. ...................................... 429/64; 429/76; 137/414; 137/433
[58] Field of Search ........................ 429/76, 72, 74, 64, 429/61, 63, 73, 80, 79; 137/414, 433

[56] References Cited

U.S. PATENT DOCUMENTS

| | | | |
|---|---|---|---|
| 1,467,966 | 9/1923 | Watzman | 429/64 |
| 3,189,063 | 6/1965 | Lowe | 137/433 |
| 4,013,091 | 3/1977 | Hudson | 137/414 |
| 4,386,141 | 5/1983 | Weidner et al. | 429/64 |

Primary Examiner—Anthony Skapars
Attorney, Agent, or Firm—Charles W. Chandler

[57] ABSTRACT

An automatic battery watering device includes a housing mounted in the battery cell opening. The housing has a chamber for receiving pressurized water, an internal valve opening for passing the water into the cell, a valve pin mounted in the valve opening, a float that is mounted in the battery electrolyte and connected to the lower end of the pin so as to rise and fall in response to a change in the liquid level in the cell, and a pair of internally mounted diaphragms which center and support the pin and float. The pin has a valve member for blocking the internal valve opening when the float is at an appropriate level. When the float is lowered after a drop in the level of the electrolyte, the internal valve member opens so water can flow into the battery to replenish the liquid level. The housing passes gas from the battery to the atmosphere along a path independent of the water passage.

9 Claims, 2 Drawing Sheets

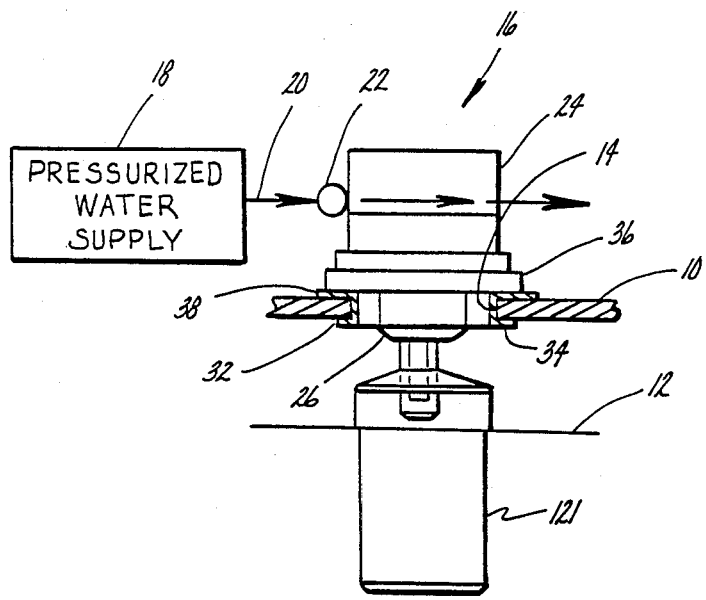
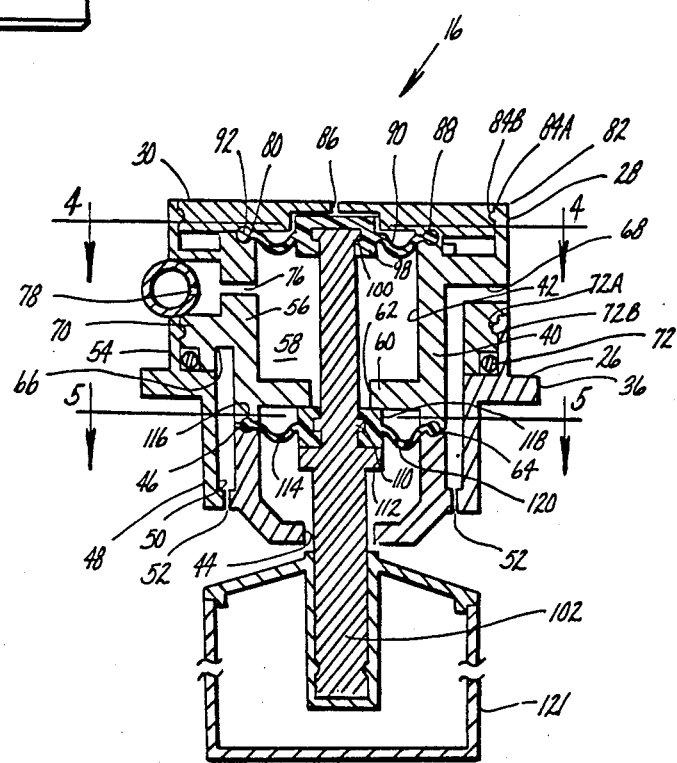
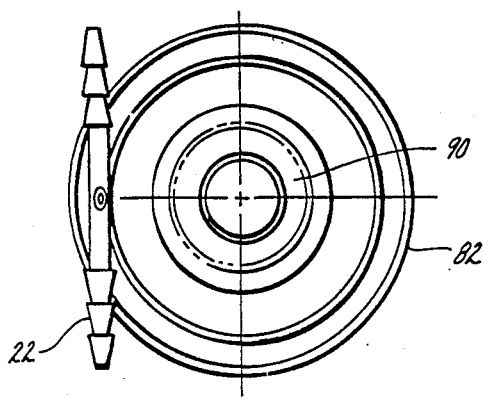
fig. 1
fig. 3
fig. 4

BATTERY WATERING DEVICE

BACKGROUND OF THE INVENTION

This invention is related to watering devices for automatically replenishing a liquid reservoir, such as in a battery, while simultaneously allowing battery gas build-up to be released, and more particularly to an automatic watering device having a housing mounted in the battery cell opening, and a float and valve pin suspended by a pair of internally mounted diaphragms for opening and closing a valve opening in the housing to either open or close communication between the source of water and the battery.

Many devices are known in the art for automatically maintaining the liquid level in an electric battery cell at an appropriate level. See, for example, U.S. Pat. No. 4,386,141 which issued May 31, 1983 to Evert C. Weidner and William B. Brecht. The problem with conventional automatic watering devices is that they sometimes employ a mechanical linkage which tends to become unreliable over a period of time, or they will not permit the gas build-up in the cell to be adequately released when the water delivery valve is closed.

SUMMARY OF THE INVENTION

The broad purpose of the present invention is to provide an improved automatic watering device, having particular utility for automatically maintaining a minimum level of liquid in a battery. The preferred device includes a housing mounted in the battery cell opening. A pair of internally mounted diaphragms have their edges attached to the housing, one above the other. The midsections of the two diaphragms support a vertical valve pin. The lower end of the pin is connected to a float that is in contact with the liquid in the battery.

As the float is lowered, the valve pin opens the valve opening to permit water to pass from a source of water into the battery. As the float rises from the introduction of the water, it reaches a point at which the valve member closes the valve opening. This closing motion is assisted by one of the diaphragms which causes the valve to snap into its closed position. When the valve is closed, pressurized water beneath one of the diaphragms opposes the downward bias of the float until the pressure of the trapped water is released.

The housing has an internal gas passage with an inlet above the float, and an outlet above the battery opening for passing gas from the battery while the water valve opening is closed. A torturous path element can be inserted in the gas passage to form a flame-retardent device.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a partially schematic view of a battery watering device illustrating the preferred embodiment of the invention, mounted in a battery;

FIG. 3 is a view similar to FIG. 2 illustrating the watering device in its closed position;

FIG. 4 is a view generally as seen along lines 4—4 of FIG. 3; and

DESCRIPTION OF THE PREFERRED EMBODIMENT

Figure 2:
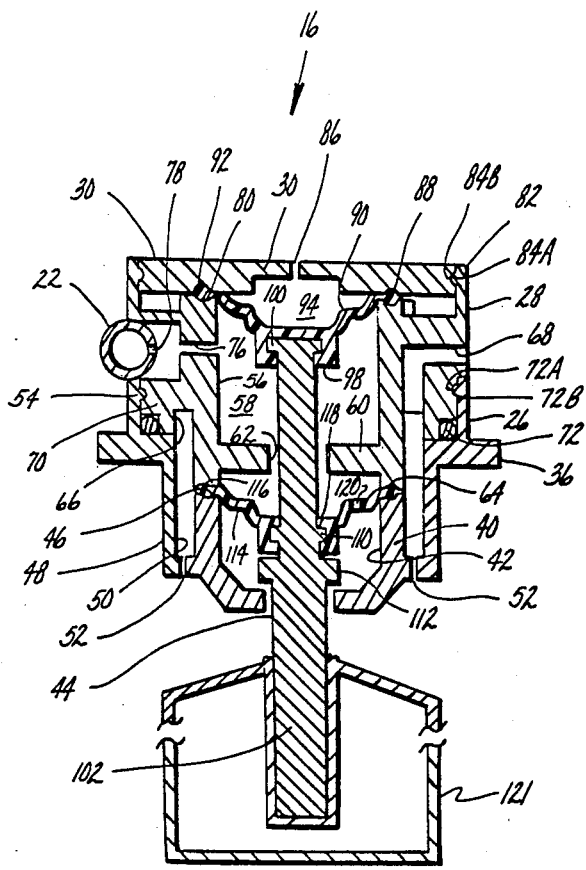
FIG. 2 is an enlarged sectional view of the automatic watering device in its open position for delivering water to the battery.

Referring to the drawings, FIG. 1 illustrates the top wall 10 of a conventional battery case for containing a liquid electrolyte 12. Wall 10 has a cell-filling opening 14 for introducing water to replenish the electrolyte level. A battery watering device, generally indicated at 16, is mounted in cell opening 14 for delivering water from a source 18 of pressurized water, usually about 10 p.s.i., through a conduit 20. The water is received through a "T" connection 22 into a housing 24. The housing has a generally cylindrical base 26, a body 28, and a cap 30.

Referring to FIG. 1, a pair of ribs 32 and 34 disposed on opposite sides of base 26 to form a bayonet type fitting for engaging the lower inside edge of battery opening 14. The arrangement is such that the user can insert the base into the cell opening, and lock it in position with a twisting motion. Other types of locking connections can be used such as a screw-type connection.

The base also has an annular flange 36 seated on a conventional annular gasket 38 around the top edge of cell opening 14.

Base 26 has an annular, inner wall 40 forming an inner chamber 42 which terminates with a bottom central opening 44. The upper edge of wall 40 has a rounded annular seat 46. The base also has an outer annular wall 48 forming an internal gas passage 50. The bottom of the base has multiple inlet vent openings 52 providing communication into gas passage 50. The base also has an upper annular wall 54.

Body 28 has an inner annular wall 56 defining upper chamber 58. Wall 56 also has an annular shoulder 60 having a central valve opening 62. The lower edge of wall 56 is rounded to form annular seat 64. The body also has an annular channel 66 which partially caps off gas passage 50.

The body has several vent openings 68 (only one shown) which communicate with the gas passage for discharging battery gas received through lower vent openings 52 to a position above flange 36 so that the gas is exhausted outside of the battery cell.

The body has an annular shoulder 70 telescopically received within annular wall 54 of the base. "O" ring 72 provides an optional fluid-tight seal between the body and the bse. Wall 54 has a generally annular ridge 72A which snaps into engagement with an annular channel 72B formed in shoulder 70. Wall 56 has an opening 76 for receiving water into the upper chamber 58 from "T" connection 22 and opening 78.

The upper edge of wall 56 is rounded to form annular seat 80, and the top portion of the body has an annular wall 82.

Cap 30 is mounted in annular wall 82, and has an annular channel 84A for snapping the cap on an annular ridge 84B on wall 82. The cap has a central vent opening 86 and an annular seat 88.

A flexible diaphragm 90 has an annular enlarged rim 92 clamped between seat 88 of the cap and seat 80 of the upper body wall to form an air chamber 94 above the diaphragm. The diaphragm forms a water-tight seal between upper chamber 58 and air chamber 94. Vent opening 86 accommodates a change in volume of chamber 94.

The diaphragm has a midsection with sufficient flexibility that it can be moved between lower and upper positions as illustrated in FIGS. 2 and 3, respectively. Diaphragm 90 has a centrally located annular shoulder 98 connected to the upper enlarged end 100 of valve pin 102. The arrangement is such that as the pin is raised and lowered, the midsection of the diaphragm moves with the pin, however, rim 92 of the diaphragm remains trapped between the body and the cap.

Diphragm 90 helps to support the valve pin in a central position in both valve opening 62 and bottom opening 44. The pin has a diameter less than that of valve opening 62 so that water can pass between the pin and the valve opening when it is unblocked. Similarly, the lower section of the pin has a diameter less than that of opening 44 so that water can drain down between the annular opening between the pin and opening 44.

Valve pin 102 has an upper, narrow, annular shoulder 110, and a larger lower annular shoulder 112.

Figure 5:
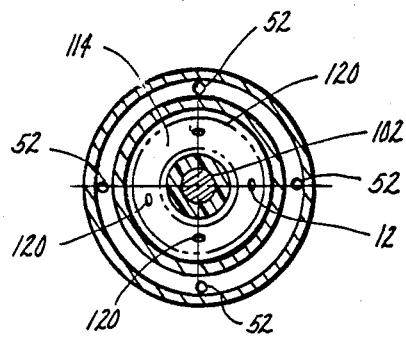
FIG. 5 is a view generally as seen along lines 5—5 of FIG. 3.

A lower diaphragm 114 is mounted in chamber 42 and has an annular rim 116 clamped between seat 64 of wall 56 and seat 46 of wall 40. Diaphragm 114 has an enlarged midsection 118 wrapped around annular shoulder 110 so that the midsection moves up and down with the valve pin. The enlarged midsection 118 is adapted to block off valve opening 62, as illustrated in FIG. 3, when the pin is in its raised position. Thus, the diaphragm midsection functions as a valve member. Diaphragm 114 has several annularly spaced openings 120, best illustrated in Figure 5, providing fluid communication between the upper and lower sides of the diaphragm.

Shoulder 112 is engageable with the bottom of the base to define the lowermost position of the valve pin.

A hollow body 121 is attached to the lower end of pin 102 and functions as a float when disposed in the battery electrolyte, as illustrated in FIG. 1.

Normally several battery cells are connected in series and filled with water from a common source. When filling of cells is completed, the source of pressurized water is removed, such as when the battery is used in a vehicle.

A small amount of pressure is trapped in upper chamber 58. The upward bias of diaphragm 90 produced by the trapped pressure keeps the valve closed. This prevents passage of gas from the cell up into the water source lines and on to other cells. When the electrolyte level drops, the downward bias alone of the "hollow body" float is insufficient to overcome the upward bias of the trapped pressure acting on diaphragm 90. However, once any device in the system (of several) loses this trapped pressure, as by bleeding, the interconnecting lines between devices allow all the other devices to lose their trapped pressure. Their respective floats can then drop to open the valves.

The valve opening 62 then permits the pressurized water to pass from "T" connection 22 through opening 76 and down from upper chamber 58 through diaphragm openings 120 into lower chamber 42, then down through opening 44 into the battery cell. As the water passes down into the battery cell, the electrolyte level begins to rise and eventually raise the valve pin with the hollow body until the midsection of the lower diaphragm approaches valve opening 62. As this lower opening is being reduced, the pressurized water in the upper chamber then acts upwardly against the lower surface of the upper diaphragm providing an upward force which tends to snap the valve pin upwardly, closing valve opening 62 and trapping pressurized water in chamber 58. The pin remains in its raised position, with valve opening 62 being closed until the cycle is repeated.

The preferred embodiment of the invention, is quiet and reliable.

Suitable material can be disposed in the gas passage to make the device flame-retardant. It is to be noted that the gas can be discharged from the chamber even through valve opening 62 is closed because the gas vents along a path that bypasses the passage of the water.

Having described my invention, I claim:

1. A battery watering device, for passing water from a source of water to a battery having a cell opening, comprising:
    a housing mounted on the battery and disposed in said cell opening;
    the housing having an internal chamber with an inlet opening for receiving water from said source, the internal chamber having a valve opening;
    a float adapted to rise or fall in response to a change in liquid level in the battery cell;
    a valve member in the housing and connected to the float so as to be moveable therewith, the valve member being adapted for either opening or closing the valve opening; and
    a diaphragm mounted in said chamber and connected to the valve member so as to be moveable therewith;
    whereby the float biases the diaphragm toward a lower position to open the valve opening as the battery liquid level is being lowered, and the diaphragm biases the valve member toward a closed position as the float is being raised.

2. A combination as defined in claim 1, in which the housing is mounted in the battery cell opening.

3. A combination as defined in claim 1, including a second diaphragm disposed in said housing, the first mentioned diaphragm being disposed on one side of said valve opening, and the second diaphragm being disposed on the opposite side of said valve opening.

4. A combination as defined in claim 3, in which one of said diaphragms is disposed above the other of said diaphragms, and the float is suspended from the housing by the first and second mentioned diaphragms.

5. A combination as defined in claim 1, in which the housing has a passage having an inlet above the float and an outlet above the battery opening for passing gas from the battery at such times as the chamber valve opening is closed.

6. A combination as defined as claim 1, in which the housing has a base having means for engaging the battery cell opening, and an upper body disposed on the base, and including a second diaphragm mounted in the housing for engaging the valve member for supporting same, the second diaphragm having a periphery forming a water-tight seal between the upper body and the base.

7. A combination as defined in claim 3, in which the water is delivered from said source to said chamber under pressure so as to bias the second diaphragm to oppose the bias of the float.

8. A combination as defined in claim 7, in which the water pressure on the second diaphragm biases the float toward a raised position.

9. A device for automatically maintaining a minimum water level in a container having a liquid-filling opening, comprising:
- a housing mounted on the container opening, and adapted to receive a pressurized liquid from a source of same, the housing having an internal chamber for receving liquid from each source, and a valve opening for passing the liquid from the chamber to said container;
- a float adapted to rise or fall in response to a change in liquid level in the container;
- a valve member in the housing and connected to the float so as to be moveable therewith, the valve member being adapted for either opening or closing the valve opening; and
- a diaphragm mounted in said chamber and connected to the valve member so as to be moveable therewith to a position in which pressurized liquid is trapped between the diaphragm and the valve opening to bias the diaphragm and the valve member to oppose downward motion of the float;
- whereby the float biases the diaphragm toward a lower position to open the valve opening as the container's liquid level is being lowered, and the diaphragm biases the valve member and the float toward a raised position when liquid is trapped beneath the diaphragm.

* * * * *